J. W. ELLIOT.
MICA LIGHT FOR STOVES.
No. 174,215. Patented Feb. 29, 1876.
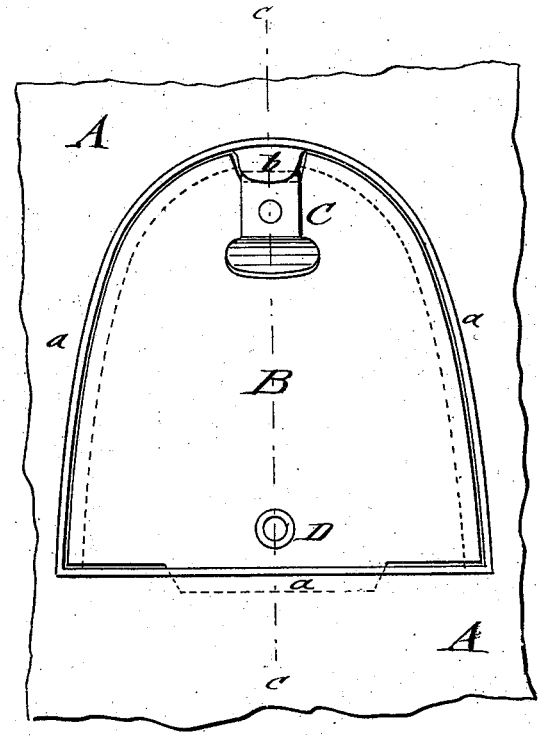

UNITED STATES PATENT OFFICE.

JOHN W. ELLIOT, OF TORONTO, CANADA.

IMPROVEMENT IN MICA LIGHTS FOR STOVES.

Specification forming part of Letters Patent No. 174,215, dated February 29, 1876; application filed January 3, 1876.

*To all whom it may concern:*

Be it known that I, JOHN W. ELLIOT, of Toronto, Province of Ontario, Canada, have invented a new and Improved Mica Light for Stoves, of which the following is a specification:

Figure 1 represents a front elevation, and Fig. 2 a vertical transverse section on line c c, Fig. 1, of my improved mica light for stoves.

Similar letters of reference indicate corresponding parts.

The invention consists in a mica light, provided with a handle at the upper end, a perforation, and a strengthening-tip, the same being applied to a window-frame having a lip, all as hereinafter described and explained.

The invention consists of a mica plate with spring-tip, sprung into the rim and guard-lip of the stove-body, and being provided with an eyelet at the lower part to admit the entrance of air.

In the drawing, A represents the body of the stove, that is cast at the points arranged for the lights with a projecting flange or rim, a, and a top lip, B, around the apertures for the light. The mica plate or pane B is cut to fit exactly into the rim a, so as to close the aperture tightly when bent or sprung in. The lower edge of the mica is cut with a central extension that passes below the lower rim of the aperture and bears on the inside of the same, to form a catch or support, while the sides or corner pieces rest on the rim and retain, in connection with the side flanges, the mica from getting detached. A sheet-metal tip, C, is riveted or otherwise attached to the upper parts of the mica to strengthen the same and allow it to spring in below lip b and be detached without injury to the mica. The tip C has a perforated handle, that serves either to remove or replace the mica window with the fingers, when the stove is not heated, or by means of wire, when heated, for the purpose of cleaning the mica with a damp cloth when desired. The mica is slightly bent by pressing on the tip, and then either sprung in in or out, as required.

The lower part of the mica is provided, near the base of the aperture, with an eyelet, D, that serves to admit fresh air, for the purpose of causing the smoke and gas to pass off or consume the same.

When the fuel is lighted and the draft turned down to the base of the stove, a constant circulation and radiation are produced by the air-current entering the eyelets of the mica light. The mica lights for stoves are in this manner attached in a very simple and convenient manner without the use of a separate frame, hinges, keepers, pins, and other appliances, so that the arrangement of these lights is simplified and cheapened.

Having thus described my invention, I claim as new and desire to secure by Letters Patent—

1. A mica light for stoves, having the handle-plate C at the upper end thereof, as and for the purpose specified.

2. A mica light, having perforation D and strengthening-tip C, in combination with the lip b of the window-frame, as shown and described.

JOHN WHEELER ELLIOT.

Witnesses:
LA RUE PECK,
O. P. KEITH.